(12) United States Patent
Jeraj et al.

(10) Patent No.: US 10,142,136 B1
(45) Date of Patent: Nov. 27, 2018

(54) SELF-CONSISTENT OUTPHASING SIGNAL SEPARATION

(71) Applicant: L3 Technologies Inc., New York, NY (US)

(72) Inventors: Janez Jeraj, Farmington, UT (US); Johnny M. Harris, Layton, UT (US); David G. Landon, Bountiful, UT (US); William K. McIntire, Sandy, UT (US)

(73) Assignee: L3 Technologies Inc., New York, NY (US)

( * ) Notice: Subject to any disclaimer, the term of this patent is extended or adjusted under 35 U.S.C. 154(b) by 0 days.

(21) Appl. No.: 15/590,928

(22) Filed: May 9, 2017

Related U.S. Application Data

(60) Provisional application No. 62/333,703, filed on May 9, 2016.

(51) Int. Cl.
*H04L 25/03* (2006.01)

(52) U.S. Cl.
CPC .............................. *H04L 25/03891* (2013.01)

(58) Field of Classification Search
CPC ......... H04L 25/03878; H04L 25/03885; H04L 25/03891; H04L 27/36; H04L 27/364; H04L 27/366; H04L 27/367; H03F 1/3241
USPC ......................................... 375/295, 296, 297
See application file for complete search history.

(56) References Cited

U.S. PATENT DOCUMENTS

| | | | | |
|---|---|---|---|---|
| 6,825,719 B1 * | 11/2004 | Barak | ................... | H03F 1/0294 330/124 R |
| 7,336,753 B2 * | 2/2008 | Hasson | ................. | H03F 1/0294 327/127 |
| 7,724,839 B2 * | 5/2010 | Chen | ..................... | H03F 1/0205 375/296 |
| 7,826,553 B2 * | 11/2010 | Chen | ..................... | H03F 1/0294 375/264 |
| 2010/0149039 A1 * | 6/2010 | Komijani | ............. | H04B 7/0617 342/377 |
| 2011/0102079 A1 * | 5/2011 | Zhou | ..................... | H03F 1/0211 330/124 R |
| 2013/0210376 A1 * | 8/2013 | Hur | ..................... | H04B 1/0475 455/91 |
| 2015/0365052 A1 * | 12/2015 | Barton | ..................... | H03F 1/56 330/295 |

* cited by examiner

*Primary Examiner* — Siu Lee
(74) *Attorney, Agent, or Firm* — Workman Bydegger

(57) ABSTRACT

Embodiments are directed to systems, apparatuses and methods for providing self-consistent outphasing signal separation. In one scenario, such an apparatus includes the following: a receiver configured to receive a variable-envelope signal and an outphasing separator including a digital electronic component configured to split the received variable-envelope signal into first and second constant-envelope signals. Splitting the received variable-envelope signal includes implementing various trigonometric or other functions using a consistent phase. The apparatus further includes a first analog component chain that includes various analog electrical components configured to receive and process the first constant-envelope signal, as well as a second analog component chain that includes various analog electrical components configured to receive and process the second constant-envelope signal. The apparatus also includes an analog combiner configured to combine the first and second constant-envelope signals for transmission to other entities or systems.

18 Claims, 6 Drawing Sheets

SELF-CONSISTENT OUTPHASING SIGNAL SEPARATION

CROSS-REFERENCE TO RELATED APPLICATIONS

This application claims priority to and the benefit of U.S. Provisional Patent Application No. 62/333,703, entitled "Self-Consistent Outphasing Signal Separation," filed on May 9, 2016, which application is incorporated by reference herein in its entirety.

BACKGROUND

Outphasing, or linear amplification with nonlinear components (LINC), allows input signals to be amplified by highly efficient nonlinear power amplifiers operating at or near saturation. Each variable-envelope input signal is separated into two constant-envelope component signals. These constant-envelope signals can be processed using a chain of analog components including mixers or amplifiers that have nonlinear input-output characteristics. The two constant-envelope signals are then combined using an analog combiner to create an amplified replica of the original signal. However, due to physical differences in the analog components as well as the frequency response of the analog combiner, the amplified output signal is not a perfect reconstruction of the input signal. Indeed, these analog components may combine to introduce linear distortions and multiple spectral impurities into the output signal.

Conventionally, nonlinear analog or digital pre-distortion (DPD) approaches are applied to decrease nonlinear signal distortion of the signals going through the analog signal chain. Analog pre-distortion has very limited performance, while DPD is very complex and inefficient. Perfect linearizations are virtually impossible. DPD's complexity is manifested in complex algorithms, requiring constant updates and additional hardware in the form of feedback loops. Moreover, due to complex algorithms, a significant amount of power is consumed in digital signal processor (DSP) operations, field programmable gate array (FPGA) operations, application-specific integrated circuit (ASIC) operations, or other integrated circuit operations, lowering overall system efficiency. These efficiency losses are purely and directly converted to heat which is virtually impossible to recycle.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments described herein are directed to systems, apparatuses and methods for providing self-consistent outphasing signal separation. In one embodiment, such an apparatus includes the following: a receiver configured to receive a variable-envelope signal and an outphasing separator including a digital electronic component configured to split the received variable-envelope signal into first and second constant-envelope signals. Splitting the received variable-envelope signal includes implementing various trigonometric or other functions using a constant phase.

The apparatus further includes a first analog component chain that includes various analog electrical components configured to receive and process the first constant-envelope signal, as well as a second analog component chain that includes various analog electrical components configured to receive and process the second constant-envelope signal. The apparatus also includes an analog combiner configured to combine the first and second constant-envelope signals for transmission to other entities or systems. Corresponding methods for providing self-consistent outphasing signal separation are described further below.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to systems, apparatuses and methods for providing self-consistent outphasing signal separation. These apparatuses and methods are configured to provide improved spectral purity of output signals when using outphasing in combination with power amplification. In one embodiment, an apparatus for providing self-consistent outphasing signal separation includes the following: a receiver configured to receive a variable-envelope signal and an outphasing separator including a digital electronic component configured to split the received variable-envelope signal into first and second constant-envelope signals. Splitting the received variable-envelope signal includes implementing various trigonometric or other mathematical functions.

The apparatus further includes a first analog component chain that includes various analog electrical components configured to receive and process the first constant-envelope signal, as well as a second analog component chain that includes various analog electrical components configured to receive and process the second constant-envelope signal. The apparatus also includes an analog combiner configured to combine the first and second constant-envelope signals for transmission to other entities or systems. Corresponding methods and systems for providing self-consistent outphasing signal separation are described further below.

As mentioned above, the process of outphasing transforms a variable-envelope signal into two constant-envelope signals. This is generally shown in the component diagram 100 of FIG. 1. A variable-envelope signal is either provided by a variable-envelope signal generator 101, or is received from some other local or remote source. The persistent outphasing separator 102 transforms the variable-envelope signal into two constant-envelope signals. The two constant-envelope signals generally flow through a chain of analog and/or digital components.

Figure 1:
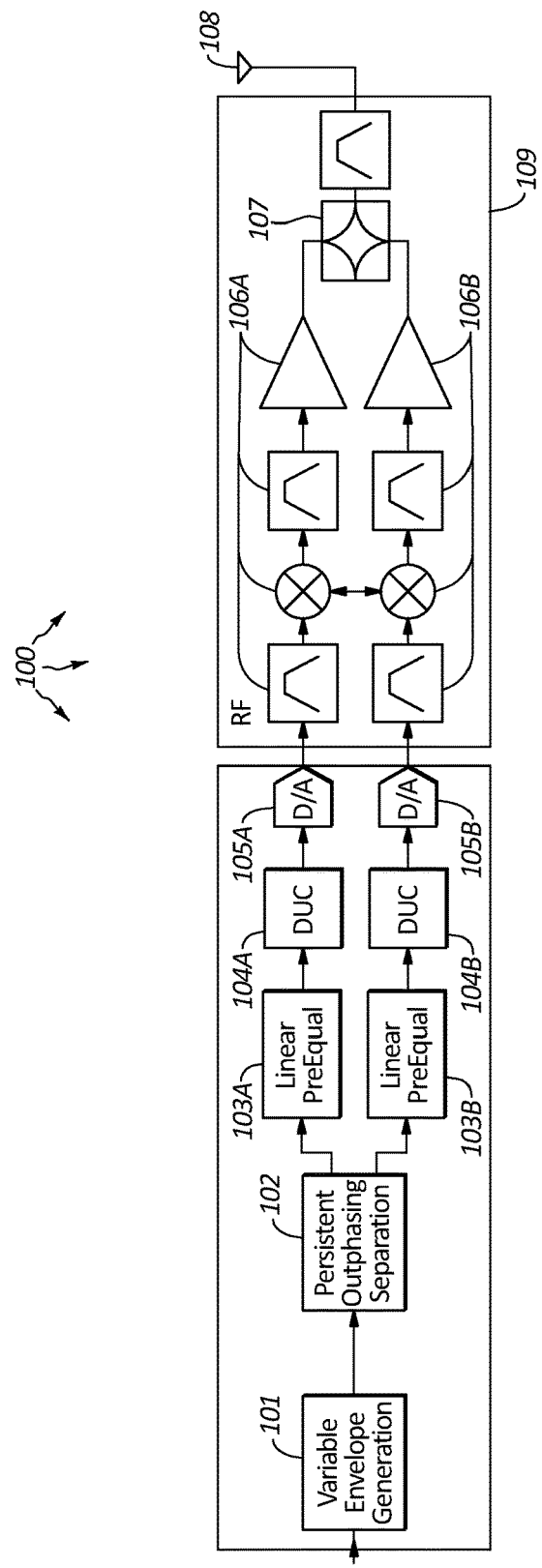
FIG. 1 illustrates an electronic component architecture in which embodiments described herein may operate including providing self-consistent outphasing signal separation.

For instance, a first constant-envelope signal may travel along the upper path shown in FIG. 1 through components 103A, 104A, 105A and 106A to the combiner 107. The second constant-envelope signal may travel along the lower path through components 103B, 104B, 105B and 106B to the combiner 107 where the first and second signals are combined and sent to a diplexer, an antenna 108 or other electrical component for further processing. It will be understood that FIG. 1 shows a generalized simplified block diagram that can be modified appropriately. It will be further understood that while certain components are shown in each of the respective component chains, any one or more of these components may be omitted or replaced with another component. Other components may also be added thereto, as long as each chain has substantially the same set of components.

Within the chain of components, the two constant-envelope signals may be amplified by highly-efficient, highly-nonlinear power amplifiers (e.g. 106A/106B). These power amplifiers may operate at or near saturation, or at any other generally nonlinear region of an analog component. In some cases, multiple power amplifiers may be implemented in the chain 106A/106B to provide multi-stage amplification. The amplified constant-envelope signals may then be summed with an analog power combiner 107 at the output to produce an amplified version of the variable-envelope input signal.

Outphasing allows each amplifier to operate in an efficient but nonlinear mode, while the final output is still highly linear. Due to differences between the two component paths 106A/106B and further due to the frequency response of the analog combiner 107, the analog combiner may not produce a perfect reconstruction of the input signal. Embodiments described herein increase the spectral purity of the output signal and thereby increase the efficiency of the system 100. These embodiments introduce a self-consistent outphasing signal separator that enables implementation of two linear pre-equalizers (103A and 103B) that equalize for the distortions of the analog paths, and enable an amplified output signal with a high level of spectral purity.

This increase in spectral purity is achieved, at least in part, due to the self-consistent signals that are created by the self-consistent outphasing signal separator. The term "self-consistent" indicates that phase ambiguities in the signal are removed, such that there are no abrupt phase changes between samples taken at different points in time. This provides a continuous-phase signal which stays continuous throughout the chain of components. Because it is a continuous-phase (constant-envelope) signal, non-linearities in the analog components do not distort the signal. As such, the signal has a high degree of linearity, even when the signal has a relatively high peak-to-average power ratio.

Indeed, when variable or non-constant-envelope signals (e.g. signals with multiple carriers, or single-carrier signals with high order constellations) are summed, signal peaks at different instances in time are higher than others, resulting in a high peak-to-average ratio for the signal. Analog components such as power amplifiers have a corresponding gain slope. When the power amplifier is near compression, the gain rolls off and the amplifier operates in a non-linear region. In cases where the input signal has a high peak-to-average ratio, the power amplifier spends a lot of time in the non-linear range, which can have deleterious effects. In the embodiments herein, the high peak-to-average input signal is divided into two signals that each have a constant peak. The instantaneous power of the constant-envelope signals is constant, and only the phase of the signals is varied. As such, at any point on the power amplifier gain curve, the constant-envelope signal stays at that point, and the non-linearities of traveling up and down the gain slope are avoided.

As will be further understood, each analog component adds distortion. Each component ages differently, behaves differently at different temperatures, etc. Because of this, no two analog chains will perform identically. Digital outphasing separation, as described herein, is performed in such a manner that phase is consistent among the signals from one time instance to another. A consistent or continuous phase means, in simple terms, that the phase of the signal does not have sudden changes such as discontinuities in phase. Trigonometric and other mathematical functions can be performed in a precise manner that prepares the signals for pre-equalization. As will be explained further below, pre-equalization compensates for the relative differences between channels that occur due to physical dissimilarities in the components.

The apparatus of FIG. 1 may include analog and/or digital components. For example, the persistent outphasing separation component 102 (or "outphasing separator 102" herein) may include digital components capable of separating a variable-envelope input signal into two constant-envelope output signals. A digital up-converter (DUC) 104A may be implemented in conjunction with a digital to analog converter (D/A) 105A to up-convert a digital signal and then change it to an analog signal. Analog components such as filters, mixers and amplifiers 106A may perform further conditioning of the signal including filtering for certain frequencies, mixing signals and performing power amplification. The combiner 107 is an analog component, configured to sum or combine the constant-envelope signals together into a single output signal. This output signal is then typically fed to an antenna 108 for transmission to outside receivers.

Figure 2:
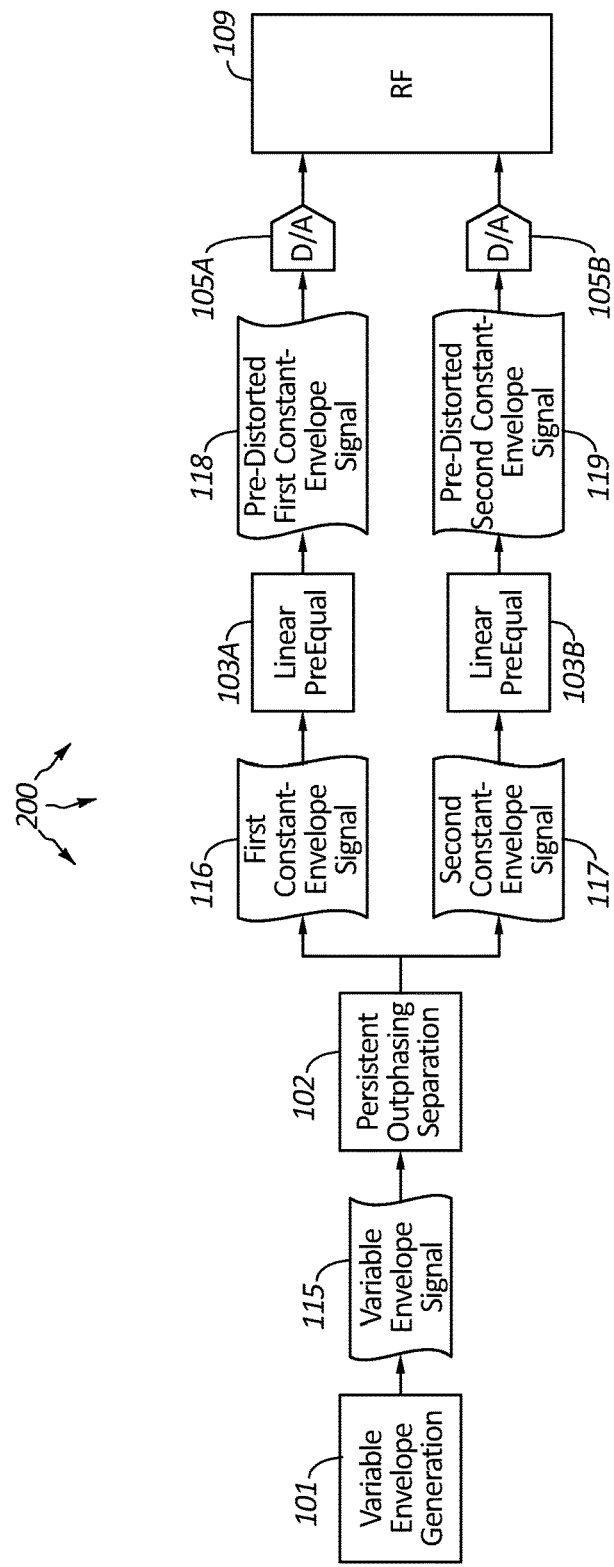
FIG. 2 illustrates an alternative electronic component architecture in which embodiments described herein may operate.

In one specific embodiment, as shown in FIG. 2, an apparatus 200 is described for providing self-consistent outphasing signal separation. The apparatus 200 includes a variable-envelope generation component 101 which may generate or receive a variable-envelope signal 115. The apparatus further includes an outphasing separator 102 with at least one digital component configured to split the received variable-envelope signal 115 into first and second constant-envelope signals 116 and 117, respectively. Splitting the received variable-envelope signal includes implementing one or more trigonometric functions (or their inverses), or other mathematical functions using a continuous phase.

Implementations of trigonometric functions may include direct calculation-based implementations, look-up table-based implementation, or any other suitable operation including the use of simplified models to split the variable-envelope signal 115 into two constant-envelope signals. The digital component of the persistent outphasing separator 102 may perform the trigonometric and other mathematical functions used to split the input signal using a continuous phase. The separation can be performed on a baseband, intermediate frequency (IF) or radio frequency (RF) signal. Implementing a continuous phase allows signal separation in a way where there are substantially no abrupt phase changes between samples (i.e. from one time instant to another). This provides a signal which may then be provided to a pre-equalizer (103A/103B) for relative equalization between channels.

Continuing this embodiment, the apparatus 200 for providing self-consistent outphasing signal separation includes a first analog component chain 106A that includes one or more analog electrical components configured to receive and process a first constant-envelope signal. The apparatus also includes a second analog component chain 106B that includes one or more analog electrical components configured to receive and process a second constant-envelope signal. The apparatus further includes an analog combiner 107 configured to combine the first and second constant-envelope signals for transmission by an antenna 108. The signal separation generated by the persistent outphasing separator 102 persists throughout processing of the first and second constant-envelope signals. When the variable-envelope signal is split using trigonometric functions with a continuous phase, abrupt phase changes between samples are prevented.

The variable-envelope signal generated by the variable envelope generator 101 may be a signal that includes multiple carriers or may be a signal with a single high order carrier. As noted above, such signals may have high peak-to-average values. In such cases, the apparatus 200 takes one input signal with a peak-to-average ratio and divides it into two signals with constant envelopes. The apparatus then varies the phase of the two signals, such that anywhere on the signal curve, the signal stays at that (constant) envelope and is insensitive to any non-linearities that it may encounter as a result of traveling up and down an amplifier's gain slope.

The persistent outphasing separator 102 splits the variable-envelope signal received from 101 by mathematically decomposing the signal into two outphased components of consistent but non-constant phase (i.e. constant envelope). The mathematical decomposition is defined by mathematical operations including trigonometric functions and their inverses. For instance, the inverse of the sine or cosine or tangent will have two mathematically valid results between 0 and 360 degrees. Traditional implementations attempt to resolve ambiguities in the signal by restricting the range between 0-180 degrees (or −90 to +90 for tangent) to avoid having a non-function in the inverse. In such cases, there may be locations where the phase jumps dramatically (e.g. by 180 degrees). Such jumps are evident in the signal, appearing as artifacts including spurious tones, distortion effects, etc. The embodiments herein apply a mathematical decomposition that uses a physics-aware trigonometric function to provide a continuous, self-consistent signal separation that avoids these jumps in the signal.

Once the input signal is split into two constant-envelope signals 116/117, the split signals may be sent to first and second pre-equalizers (e.g. 103A and 103B). These pre-equalizers may be configured to receive the split constant-envelope signals and apply a pre-equalization to the signals. As such, the validity of the outphasing decomposition is preserved, minimizing artifacts in the reconstituted signal produced in the analog combiner 107. Using this method, non-linearities in the amplifiers (or other analog components) enable highly linear amplification. These pre-equalized constant-envelop signals 118/119 are then sent to the D/A converters 105A/105B, and on to the analog components in box 109.

In some cases, distortions may be removed from the combined signal using a filter implemented after the analog combiner 107. This then results in a highly linear output signal (largely devoid of inter-modulation distortion (IMD) products), especially in cases where the input signal has a high peak-to-average power ratio. Outphasing in this manner thus removes distortions (especially the problematic IMD products) and allows the power amplifiers to operate at compression. In some cases, a filter is implemented after the analog combiner 107, which may further remove harmonics or other unwanted signal characteristics. This allows the apparatus to function in a much more power-efficient manner. These concepts will be described further below with regard to method 300 of FIG. 3.

Figure 3:
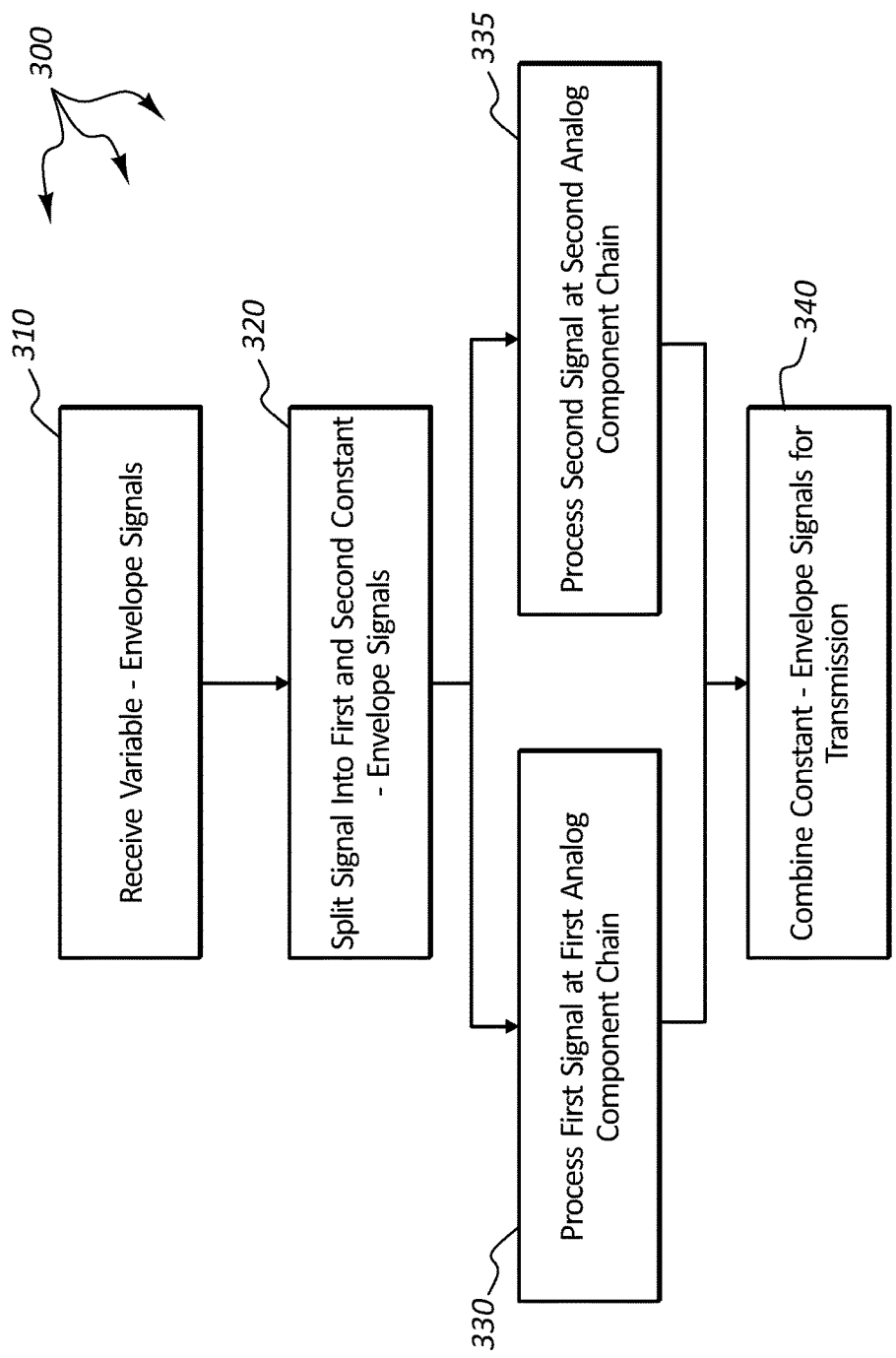
FIG. 3 illustrates a flowchart of an example method for providing self-consistent outphasing signal separation.

In view of the systems and architectures described above, methodologies that may be implemented in accordance with the disclosed subject matter will be better appreciated with reference to the flow chart of FIG. 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 3 illustrates a flowchart of a method 300 for providing self-consistent outphasing signal separation. The method 300 will now be described with frequent reference to the components and data of apparatuses 100 and 200 of FIGS. 1 and 2.

Method 300 includes receiving a variable-envelope signal (310). For example, the persistent outphasing separation component 102 may receive variable envelope signal 115 from a variable-envelope generation component 101, or from another signal source.

Method 300 next includes splitting the received variable-envelope signal into first and second constant-envelope signals, wherein splitting the received variable-envelope signal comprises implementing one or more functions using a constant phase (320). The separator 102 separates the variable-envelope signal 115 into first and second constant-envelope signals 116/117. These signals are then processed individually, where the first constant-envelope signal 116 is processed at one or more analog electrical components of the first analog component chain 106A (330), and where the second constant-envelope signal 117 is processed at one or more analog electrical components of the second analog component chain 117 (335). Upon exiting the respective analog component chains, the first and second constant-envelope signals 116/117 are combined for transmission to one or more other entities or systems (340).

The method 300 may be performed on an apparatus such as 100 of FIG. 1 or 200 of FIG. 2. The apparatus may include a receiver configured to receive a variable-envelope signal, an outphasing separator that includes a digital component configured to split the received variable-envelope signal into first and second constant-envelope signals, two analog component chains to receive and process the constant-envelope signals, and an analog combiner that combines the constant-envelope signals for transmission to an antenna. The phase separation provided by component 102 persists throughout processing of the constant-envelope signals 116/117.

Signal separation may be performed on a baseband, IF or RF signal. Splitting the variable-envelope signal using various functions at a continuous phase prevents abrupt phase changes between samples. Variable-envelope signals produced by the variable-envelope signal generator 101 may be signals with multiple carriers or signals with a single carrier. The splitting of these variable-envelope signals includes mathematically decomposing the variable-envelope signal into two outphased paths of constant envelope. The mathematical decomposition, at least in some cases, is defined by trigonometric and other mathematical functions, and their inverses. These trigonometric functions may be physics-aware functions, thereby providing more accurate signal splitting.

Apparatuses for performing method 300 may also include first and second linear pre-equalizers 103A/103B configured to receive the first and second constant-envelope signals 116/117 and apply pre-distortion. The pre-equalization applied by the pre-equalizers results in pre-equalized first and second constant-envelope signals 118 and 119. The pre-equalization is based on component properties of the analog chain 106, which may include mixers, amplifiers, filters or other components. Each of these components may have different operating characteristics. These may include filters that have slightly different filtering bands, or amplifiers with slightly different amplifying power. Other characteristics may also be taken into account such that, when the pre-equalization is applied, the signal distortions are summed out by the analog combiner 107. In other words, the pre-equalizations added by the linear pre-equalizers 103A/103B add signal distortion that, when combined, cancel each other out. Then, only the pure, constant-envelope signal remains.

Figure 4:
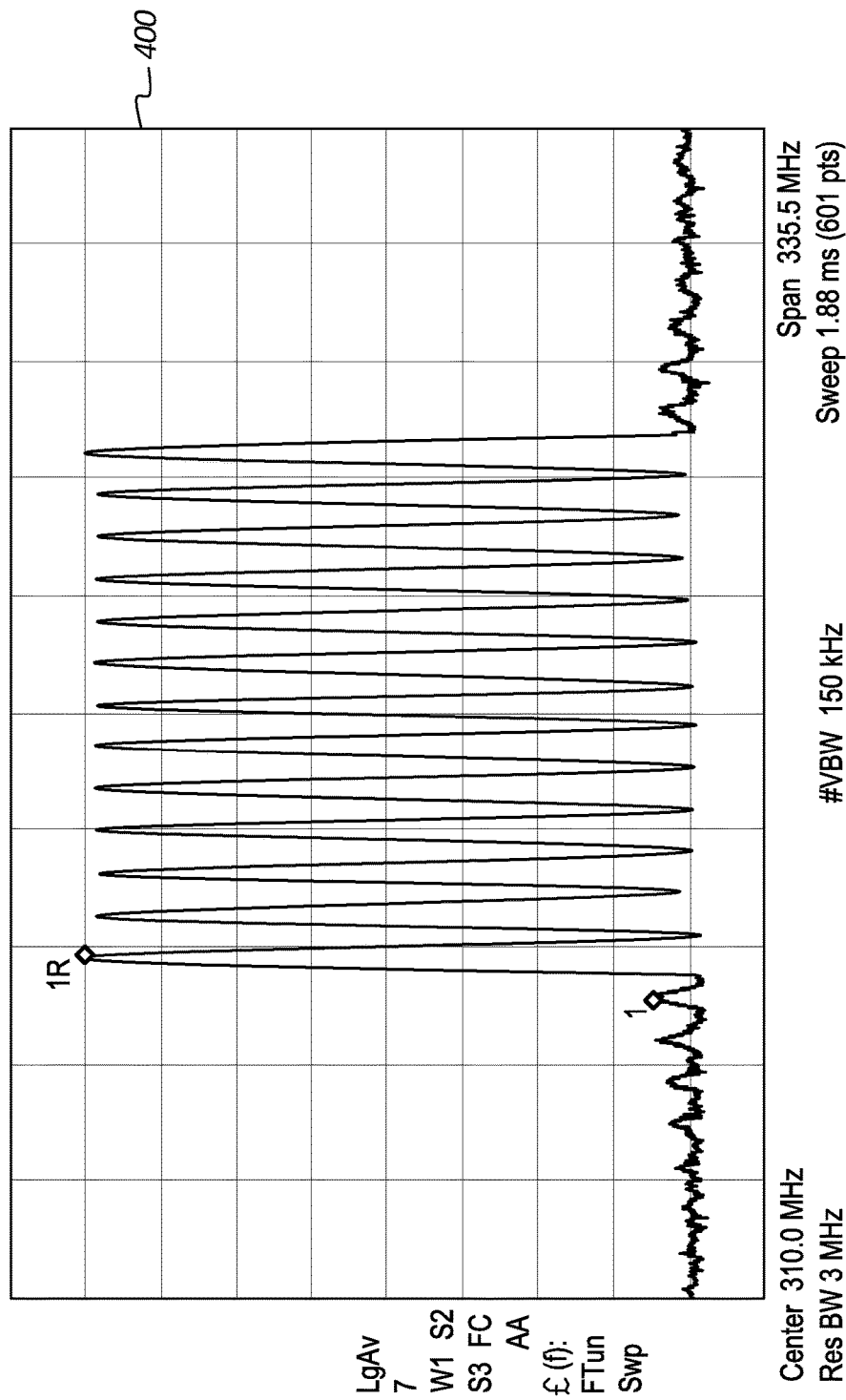
FIG. 4 illustrates an example waveform of an outphased signal with a center frequency of 310.0 MHz.

The pre-equalization inputs can thus resolve physical, component-based differences in the first and second analog component chains 106A/106B, including the analog combiner 107. The first and second linear pre-equalizers may each be individually adjusted so that upon receiving the combined first and second constant-envelope signals 116/117 at the end of the first and second analog component chains 106A/106B, the pre-equalizer adjustments compensate for relative signal differences, and these differences are canceled out in the combiner 107. FIG. 4 illustrates an example waveform of the results of this process.

Indeed, as shown in FIG. 4, the outphasing approach described herein offers an alternative to highly linear amplification of communications signals. The apparatus 100 allows implementation of many different types of applications, including implementation of multicarrier waveforms. Hardware demonstrations, such as that shown in FIG. 4, are capable of producing highly increased spectral purity with a multicarrier waveform. The illustrated waveform in chart 400 is a 13-carrier, 16 kbps frequency shift keying (FSK) modulated signal with a peak-to-average power ratio (PAPR) of about 11.1 dB. The occupied bandwidth is between approximately 225 MHz and 400 MHz. It should be noted that the spurs are highly suppressed—much more so than in traditional methods. These results effectively demonstrate superior levels of linear amplification and IMD suppression, which cannot be achieved using conventional amplification techniques.

In FIG. 2, the first and second constant-envelope signals 116/117 are signals with a constant magnitude and a varied phase. These signals thus have a (very) low peak-to-average ratio. These constant-magnitude, phase-varied signals allow the apparatus 200 to remain within a specified range of a power amplifier gain slope curve. This, in turn, allows the power amplifier to operate linearly at its most efficient level, thereby reducing power consumption of the system. Reductions in power consumption may be highly beneficial in mobile devices that are constrained by battery usage requirements. With the power amplifiers operating at optimum levels, relatively little energy is wasted in these components, which contributes to an overall reduction in energy usage.

Indeed, the constant-magnitude, phase-varied signals allow the apparatus 200 to avoid non-linear distortions of the power amplifier's gain slope curve. This improves efficiency and leads to more durable device. Moreover, because the phase of the first and second constant-envelope signals 116/117 remains substantially consistent from one time instance to another, precise pre-equalized inputs may be provided by the linear pre-equalizers 103A/103B. These pre-equalization inputs may be very small changes to the signal, depending on the degree of difference between the first analog component chain 106A and the second analog component chain 106B.

As noted previously above, systems for providing self-consistent outphasing signal separation may be provided in addition to apparatuses and methods. In one embodiment, such a system includes a variable-envelope generation component 101 configured to generate a variable-envelope signal and an outphasing separator 102 including at least one digital component configured to split the received variable-envelope signal into first and second constant-envelope signals 116 and 117. Splitting the received variable-envelope signal comprises implementing various mathematical functions using a consistent phase.

The system further includes a first linear pre-equalizer 103A configured to equalize the first constant-envelope signal relative to the second constant-envelope signal, and a second linear pre-equalizer 103B configured to equalize the second constant-envelope signal relative to the first constant-envelope signal. Still further, the system includes a first analog component chain 106A including various analog electrical components that receive and process the first constant-envelope signal, a second analog component chain 106B with various analog electrical components that receive and process the second constant-envelope signal, and an analog combiner 107 configured to combine the first and second constant-envelope signals for transmission to other entities or systems.

The persistent outphasing separator 102 may be digital, and may split the received variable-envelope signal into first and second constant-envelope signals using specified mathematical functions and/or their inverses. Indeed, in at least some cases, splitting the received variable-envelope signal includes mathematically decomposing the variable-envelope signal into two outphased paths of constant envelope. In such cases, the mathematical decomposition is defined by the mathematical functions and their inverses.

The first and second linear pre-equalizers of the system are configured to receive the first and second constant-envelope signals and apply pre-equalization such that, when applied, the pre-equalizations (in 118 and 119) are summed out by the analog combiner 107. The first and second linear pre-equalizers 103A/103B may each be individually adjusted so that upon receiving the combined first and second constant-envelope signals at the end of the first and second analog component chains, the pre-equalizer adjustments compensate for relative signal differences introduced in the analog component chains 106A/106B.

Figure 5A:
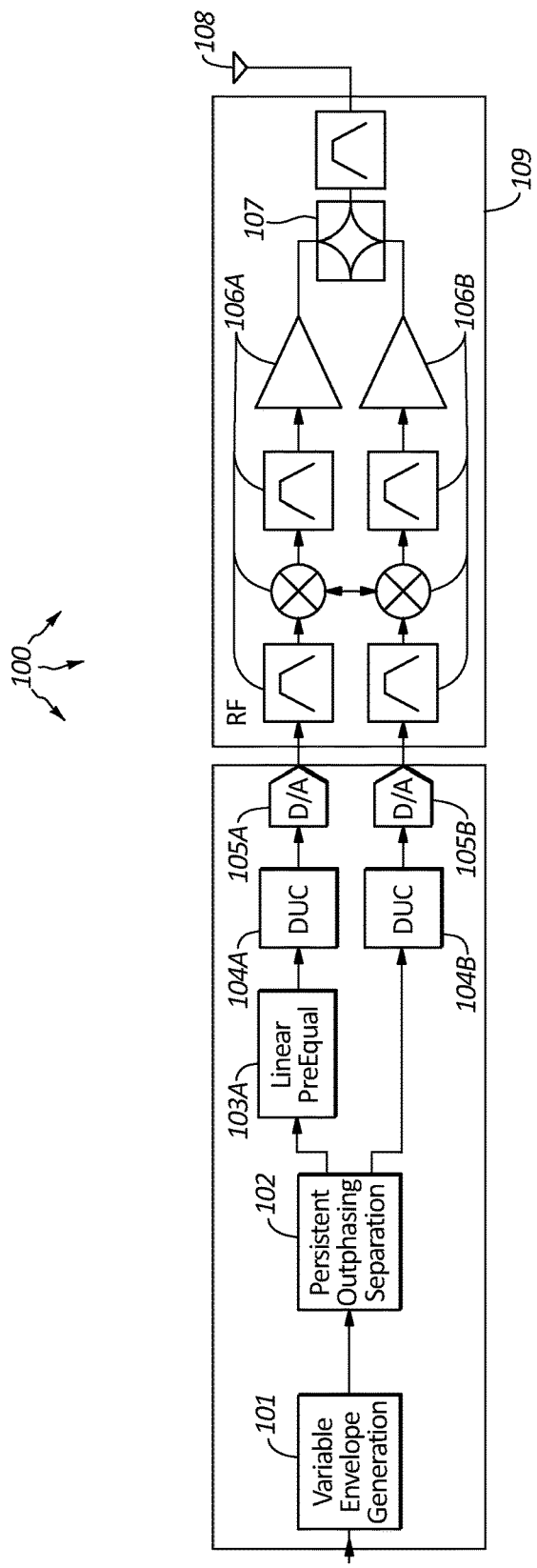
FIGS. 5A and 5B illustrate alternative electronic component architectures in which a single pre-equalizer is used.
Figure 5B:
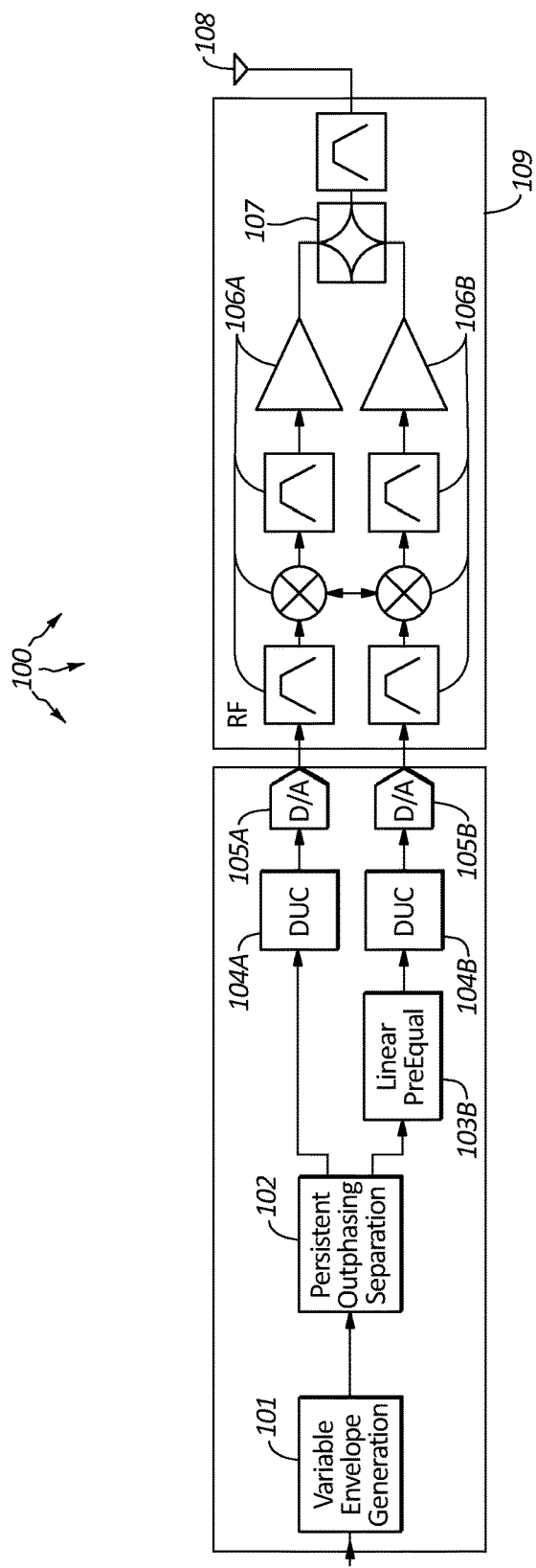

In some embodiments, as shown in FIGS. 5A and 5B, one of the pre-equalizers may be omitted. For example, in FIG. 5A, the second linear pre-equalizer 103B may be omitted. As such, the first pre-equalizer 103A is adjusted to provide a pre-equalization input such that when the combined first and second constant-envelope signals are received at the end of the first and second analog component chains 106A/106B, the first pre-equalizer adjustments compensate for relative signal differences between the first and second constant-envelope signals.

Similarly, in FIG. 5B, the first linear pre-equalizer 103A is omitted. In this case, the second pre-equalizer 103B is adjusted to provide a pre-equalization input such that when the combined first and second constant-envelope signals are received at the end of the first and second analog component chains, the second pre-equalizer adjustments compensate for relative signal differences between the first and second constant-envelope signals. Thus, pre-equalizers may be used in both outphasing paths, or may only be used in one of the outphasing paths.

Accordingly, apparatuses and methods are described herein which provide self-consistent outphasing signal separation, so that outphasing may be performed consistently and efficiently within a system. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. An apparatus for providing self-consistent outphasing signal separation, the apparatus comprising:
    a receiver configured to receive a variable-envelope signal;
    an outphasing separator comprising at least one digital component configured to split the received variable-envelope signal into first and second, constant-envelope signals, wherein splitting the received variable-envelope signal comprises applying functions using consistent phase;
    a first analog component chain comprising one or more analog electrical components configured to receive and process the first, constant-envelope signal;
    a second analog component chain comprising one or more analog electrical components configured to receive and process the second consistent phase, constant-envelope signal;
    an analog combiner configured to combine the processed first and second constant-envelope signals for transmission to one or more other entities or systems; and
    first and second linear pre-equalizers configured to receive the first and second constant-envelope signals and apply pre-equalization such that, when applied, signal distortions are summed out at the output of the analog combiner.

2. The apparatus of claim 1, wherein the signal separation is phase-consistent throughout processing of the first and second constant-envelope signals.

3. The apparatus of claim 1, wherein the consistent phase outphasing separator is configured to perform the separation on a baseband, IF or RF signal.

4. The apparatus of claim 1, wherein the received variable-envelope signal comprises a signal with multiple carriers or a signal with a single carrier.

5. The apparatus of claim 1, wherein the outphasing separator is configured to split the received variable-envelope signal by mathematically decomposing the variable-envelope signal using one or more trigonometric and other mathematical functions and their inverses such that decomposing the variable envelope signal is performed without causing discontinuities in signals resulting from the decomposition.

6. The apparatus of claim 5, wherein the mathematical decomposition implements a physics-aware function.

7. The apparatus of claim 1, wherein the first and second linear pre-equalizers are configured to compensate for physical component-based differences in at least one of the first analog component chain, the second analog component chain, or the combiner.

8. The apparatus of claim 1, wherein the first and second linear pre-equalizers are each individually adjusted such that upon receiving the combined, processed first and second consistent phase, constant-envelope signals at the end of the first and second analog component chains, the pre-equalizer adjustments are configured to compensate for relative signal differences.

9. A method for providing self-consistent outphasing signal separation, the method comprising:
    receiving a variable-envelope signal;
    splitting the received variable-envelope signal into first and second constant-envelope signals, wherein splitting the received variable envelope signal comprises applying one or more functions suing a consistent phase;
    processing the received first constant-envelope signal at one or more analog electrical components of a first analog component chain;
    processing the received second constant-envelope signal at one or more analog electrical components of a second analog component chain;
    combining the processed first and second constant-envelope signals for transmission to one or more other entities or systems; and
    wherein the phase of the first and second constant-envelope signals remain substantially consistent from one time instance to another, allowing for precise pre-equalization inputs in linear pre-equalizers.

10. The method of claim 9, wherein the first and second constant-envelope signals comprise signals with a constant envelope and a varied phase.

11. The method of claim 10, wherein the constant-envelope, phase-varied signals allow an apparatus to remain within a specified range of a power amplifier gain slope curve.

12. The method of claim 11, wherein the constant-envelope, phase-varied signals allow the apparatus to avoid non-linear regions of the power amplifier's gain slope curve.

13. The method of claim 12, wherein splitting the received variable-envelope signal into first and second constant-envelope signals comprises using one or more specified functions.

14. A system for providing self-consistent outphasing signal separation, the system comprising:
    a variable-envelope generation component configured to generate a variable-envelope signal;

an outphasing separator comprising at least one digital component configured to split the generated variable-envelope signal into first and second constant-envelope signals, wherein splitting the generated variable-envelope signal comprises implementing one or more functions using a consistent phase;

an equalizer stage that comprises at least one of the following:

a first linear pre-equalizer configured to equalize the first constant-envelope signal relative to the second constant-envelope signal; or a second linear pre-equalizer configured to equalize the second constant-envelope signal relative to the first constant-envelope signal, such that the first or second linear pre-equalizers equalize one or more linear differences between the first or second constant-envelope signals;

a first analog component chain comprising one or more analog electrical components configured to receive and process the first constant-envelope signal;

a second analog component chain comprising one or more analog electrical components configured to receive and process the second constant-envelope signal; and an analog combiner configured to combine the processed first and second constant-envelope signals for transmission to one or more other entities or systems.

15. The system of claim 14, wherein the outphasing separator is configured to split the generated variable-envelope signal by mathematically decomposing the variable-envelope signal into two outphased signals of constant envelope, the mathematical decomposition being defined by one or more trigonometric and other mathematical functions and their inverses.

16. The system of claim 14, wherein the outphasing separator implements a mathematical decomposition and algorithm that use a physics-aware trigonometric function to provide a continuous, self-consistent signal separation that avoids phase jumps in the first and second constant envelope signals and enables effective pre-equalization.

17. The system of claim 14, wherein the first pre-equalizer is adjustable such that upon receiving the combined first and second constant-envelope signals at the end of the first and second analog component chains, the first pre-equalizer adjustments are configured to compensate for relative signal differences between the first and second constant-envelope signals.

18. The system of claim 14, wherein the second pre-equalizer is adjustable such that upon receiving the combined first and second constant-envelope signals at the end of the first and second analog component chains, the second pre-equalizer adjustments are configured to compensate for relative signal differences between the first and second constant-envelope signals.

* * * * *